United States Patent [19]
Gallentine

[11] Patent Number: 5,609,715
[45] Date of Patent: Mar. 11, 1997

[54] TIRE PUNCTURE REPAIR APPARATUS

[76] Inventor: Bill Gallentine, 615 Country Club Rd., Hood River, Oreg. 97031

[21] Appl. No.: 505,657

[22] Filed: Jul. 21, 1995

[51] Int. Cl.$^6$ .................................................. B29C 73/08
[52] U.S. Cl. ...................... 156/394.1; 81/15.5; 152/370; 156/97
[58] Field of Search .................................. 156/97, 394.1; 152/367, 370; 81/15.5, 15.6, 15.7

[56] References Cited

U.S. PATENT DOCUMENTS

| | | | |
|---|---|---|---|
| 490,369 | 1/1893 | Sloper | 81/15.5 |
| 573,049 | 12/1896 | Syme | 81/15.5 |
| 607,379 | 7/1898 | Jones | 81/15.5 |
| 2,828,657 | 4/1958 | Fromberg | 81/15.7 |
| 2,956,460 | 10/1960 | Nowotny | 81/15.5 |
| 3,013,454 | 12/1961 | Gruber | 152/370 |

Primary Examiner—Geoffrey L. Knable
Attorney, Agent, or Firm—Terrance L. Siemens

[57] ABSTRACT

A repair apparatus for tire punctures is operable upon a damaged tubeless tire in situ and includes a hollow probe initially containing a rubber boot disposed in a collapsed condition but subsequently automatically unfolding when urged into the tire interior by a plunger rod in the probe. A stem integral with a circular main body of the rubber boot is connected to the plunger rod by a flexible tether that serves to retain the unfolded boot juxtaposed the puncture point inside the tire while a drive rod forces a measured amount of rubber bonding fluid through the probe to sealingly secure the boot. Alignment and retention of the probe and drive rod is facilitated by a mounting unit secured to the tire by adjustable attachment elements clampingly engaging the rim of the wheel mounting the tire while threads on the probe and drive rod cooperate with tapped bores in the mounting unit to permit controlled advancement and retraction of the probe and drive rod.

10 Claims, 2 Drawing Sheets

TIRE PUNCTURE REPAIR APPARATUS

BACKGROUND OF THE INVENTION

1. Field of the Invention

This invention relates generally to tire repair devices and more particularly, to an improved apparatus for repairing tire punctures in situ and finds especial advantages in the repair of large truck, off road, or industrial vehicle tires.

When a vehicle tire is observed to be flat or fails to hold air and no damage is observed to the tire valve, bead or sidewall, the usual culprit is a puncture through the tread such as caused by a nail or spike. Obviously the initial step in any subsequent repair procedure is to remove the foreign member. Thereafter, in the case of most smaller, lower pressure tires as used on automobiles, the repair comprises the insertion of an elongated rubber plug, strand or the like which has been impregnated with a suitable rubber cement. This is often preceded by a reaming of the puncture to roughen the walls of the bore. A tool, akin to an awl with a hole near its tip is employed to insert the cement-saturated rubber plug or strand. Such a repair procedure usually suffices for those smaller, lower pressure types of tires even though little consistency exists between successive repairs. This is due to the free hand nature of the repair procedure which can actually result in significantly enlarging the puncture bore through the tire tread, thus compromising the integrity of the repair job. Additionally, no positive means are offered to regulate the degree of insertion of the rubber repair plug or strand, resulting in varying lengths of the strand being projected into and remaining within the interior of the tire casing.

In the case of larger tires as used on trucks, construction machinery and the various types of off-road vehicles, a tire repair apparatus is needed which will allow for the relatively effortless manipulation of the tool elements while addressing the substantially greater bulk of the tire tread. At the same time, means must be available to insure that a positive control over the motions of the tool is assured so that the chances of a successful repair are enhanced. Preferably, an ideal apparatus will include a single tool apparatus that includes the rubber repair component (boot or plug) as well as a pre-measured amount of suitable adhesive, such as liquid rubber cement. Such an arrangement obviates the necessity to separately stockpile these repair items and insures the use of a precise size or amount of the items for each repair.

Additionally, means are desired to insure a relatively effortless manipulation of the tool elements during the repair procedure since it is well known that accomplishing an in situ puncture repair upon an oversize tire normally requires a considerable physical effort.

As will be seen, the simplicity and effectiveness of my invention is not rivaled in the prior art.

2. Description of the Prior Art

Tools or devices for repairing punctures in pneumatic tires are broadly known in the art as exemplified in the following described patents, all of which fail to suggest the simplicity and effectiveness of the present invention.

U.S. Pat. No. 3,785,896 issued to Kassel on Jan. 15, 1974 is an earlier example of a tire puncture repair system and wherein a needle tool inserted through the puncture supports an elastic strand that is twisted into a helically convoluted formation that is subsequently coated with cement. The coated plug member thus formed is manually inserted through the puncture with the tool then being disengaged from the placed plug to permit its removal from the tire. This device is wholly unlike the present apparatus wherein a precisely configured boot member is initially loaded within a probe of a tool mechanically admitted through the tire puncture by means of a threaded arrangement following which a pre-measured amount of cement is subsequently injected through the end of the tool to bond the boot to the tire casing in the area of the puncture, with this latter action likewise being mechanically controlled by the operator.

A tire repair apparatus employing threadedly attached components will be found in U.S. Pat. No. 4,009,624 issued Mar. 1, 1977 to Nishino and which illustrates a driver element initially manually inserted through a tire puncture. Continued insertion of the tool urges a surrounding sleeve member to also enter the puncture. Thereafter, the driver element is withdrawn and the sleeve member then serves to receive a plug insertion tool containing a resilient plug pretreated with cement. No hint is seen in this prior device of the instant apparatus utilizing a unitized assembly including an initial probe element which first, serves to admit a collapsed boot member through a mechanical threading action and then, serves to deliver a premeasured dose of rubber cement, likewise supplied through an operator controlled mechanical action.

U.S. Pat. No. 4,197,893 issued to O'Coin on Apr. 15, 1980 shows the inclusion of a boot-like element within a tire casing but falls far short of suggesting the current system wherein a collapsible boot member forms a part of a repair procedure. In O'Coin, a tube type tire is with a coextensive puncture resistant shield disposed intermediate the tube and tread of the tire. In the present apparatus, the boot member is for the purpose of covering and sealing a significant area overlying and surrounding the puncture point on the inside of a tubeless tire casing.

U.S. Pat. No. 4,710,249 issued Dec. 1, 1987 to Roberts illustrates a repair plug member having a peripheral sealing ring which overlies the tire casing inner surface when inserted. Robert's plug appears to rely upon a plurality of peripheral sealing rings projecting from its shank for retention of the plug when inserted and which are mentioned to enhance the retention of cement as initially applied thereto. This is contrary to the present system wherein a plug is provided that includes an expansive umbrella-like boot element that forms a primary sealed barrier over the interior end of a puncture while a central stem affixed thereto is employed principally during the application of the boot and subsequent administration of cement by the same apparatus initially inserting the boot.

A further multi-part tire repair tool is shown in U.S. Pat. No. 4,951,531 issued Aug. 28, 1990 to Nishio. In this prior art tool, a pointed rod attachable to a handle, carries a removable sheath and both elements are initially manually forced through the tire puncture to seat the sheath within the puncture. Thereafter, the handle and rod are withdrawn, the rod removed from the handle and the handle used to force a plug into the positioned sheath. Finally, the handle serves as a tool to extract the sheath while leaving the plug in place. On the other hand, with the instant apparatus, removal and replacement of elements is not necessary as a fully self-contained unitary assembly is employed wherein the sequential manipulation of portions thereof precisely inserts and positions a collapsible boot member following which a measured amount of contained cement is administered to complete the repair.

U.S. Pat. No. 2,871,205 issued Jan. 27, 1959 to Mankowich et al. claims a method of reclaiming vulcanized scrap rubber is hereby incorporated by reference.

None of the above inventions or patents, considered either singly or in any combination, is seen to even remotely describe or suggest the unique system as claimed herein.

SUMMARY OF THE INVENTION

By the present invention, an improved apparatus for repairing punctures in tubeless tires is presented and whereby a unique tool assembly is employed having a rubber repair boot member contained therein, together with a measured volume of liquid cement or adhesive composition which partially dissolves the tire rubber selected to seal the boot member in an airtight manner upon the interior surface of the tire casing, overlying the puncture. An attachment mechanism is adapted to clampingly engage a mounted tire and presents a bridge having a central span overlying the entrance opening of the puncture wound in the tire tread. Cooperating threads on the bridge receive a cylindrical probe element that serves initially to receive a collapsible, umbrella-like boot member having a central, circular portion provided with a central stem portion. A driving element is mechanically operated to controllably advance the boot member through the probe element and into the tire interior whereupon the boot member automatically unfolds into a position overlying and substantially radially extending beyond the puncture location. The same tool is subsequently mechanically manipulated to eject a premeasured amount of liquid rubber cement through the probe and out of the probe tip to fully coat the inner surface of the boot member and its central stem portion. Upon withdrawal of the probe, the stem is pulled back to urge the inner surface of the opened, umbrella portion of the boot member into engagement with the interior surface of the tire casing to complete the repair procedure. The tool apparatus is then readily unclamped or otherwise removed from the tire.

In the foregoing manner, regardless of the angle or any irregularity of the pathway of the puncture wound as it travels from the outer portion of the tire tread to the interior of the tire, the present device will be understood to provide a positive repair, particularly in view of the initially collapsed and subsequently unfolding, umbrella like boot member which insures a very extensively covering repair patch upon the interior surface of the tire casing, overlying and significantly extending radially from the puncture point within the tire. The neatness and convenience of the repair procedure is further enhanced by the provision of the measured amount of cement applied with the same tool which dissolves the tire rubber thus obviating the necessity of having to maintain a separate, bulk source of cement and having to estimate an amount to apply manually to a plug element. It will be understood that a vastly enhanced mechanical advantage is gained through the use of the bridge or platform portion of the apparatus that provides a stable base affixed to the tire casing and allowing for the mechanical or threaded advancement of the components during the repair procedure.

Accordingly, it is a principal object of the invention to provide a new and improved tire puncture repair apparatus that overcomes the disadvantages of the prior art in a simple but effective manner.

Accordingly, one of the objects of the present invention is to provide an improved tire puncture repair apparatus including a tool assembly attachable to a tire casing and initially containing a boot member that is mechanically advanced into the interior of the tire casing with the same apparatus subsequently delivering a premeasured amount of cement to secure the boot member to the inner surface of the tire casing.

Another object of the present invention is to provide an improved tire puncture repair apparatus including an external probe element threadedly engageable with an attachment element fixedly secured to a mounted tire permitting controlled advancement of the probe element through the extent of a tire puncture.

A further object of the present invention is to provide an improved tire puncture repair apparatus including a probe insertable through a tire puncture and providing an induction sleeve therein within which is disposed a collapsed boot member automatically unfolding when advanced into the tire interior to provide a circular main body attached to a central stem portion remaining within the puncture bore and which is retained in a position overlying the puncture by cement dispensed through the same induction sleeve.

Still another object of the present invention is to provide an improved tire puncture repair apparatus having a probe element containing a collapsed boot member adjacent its tip while the same tool subsequently serves to initiate the dispensing of a rubber bonding fluid upon manipulation of a plunger device.

Finally, it is a general object of the invention to provide improved elements and arrangements thereof in an apparatus for the purposes described which is inexpensive, dependable and fully effective in accomplishing its intended purposes.

With these and other objects in view, which will more readily appear as the nature of the invention is better understood, the invention consists in the novel construction, combination and arrangement of parts hereinafter more fully described, illustrated, and claimed.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views.

Preferred and practical embodiments of the invention are shown in the accompanying drawings, in which.

DETAILED DESCRIPTION OF THE PREFERRED EMBODIMENTS

Figure 1:
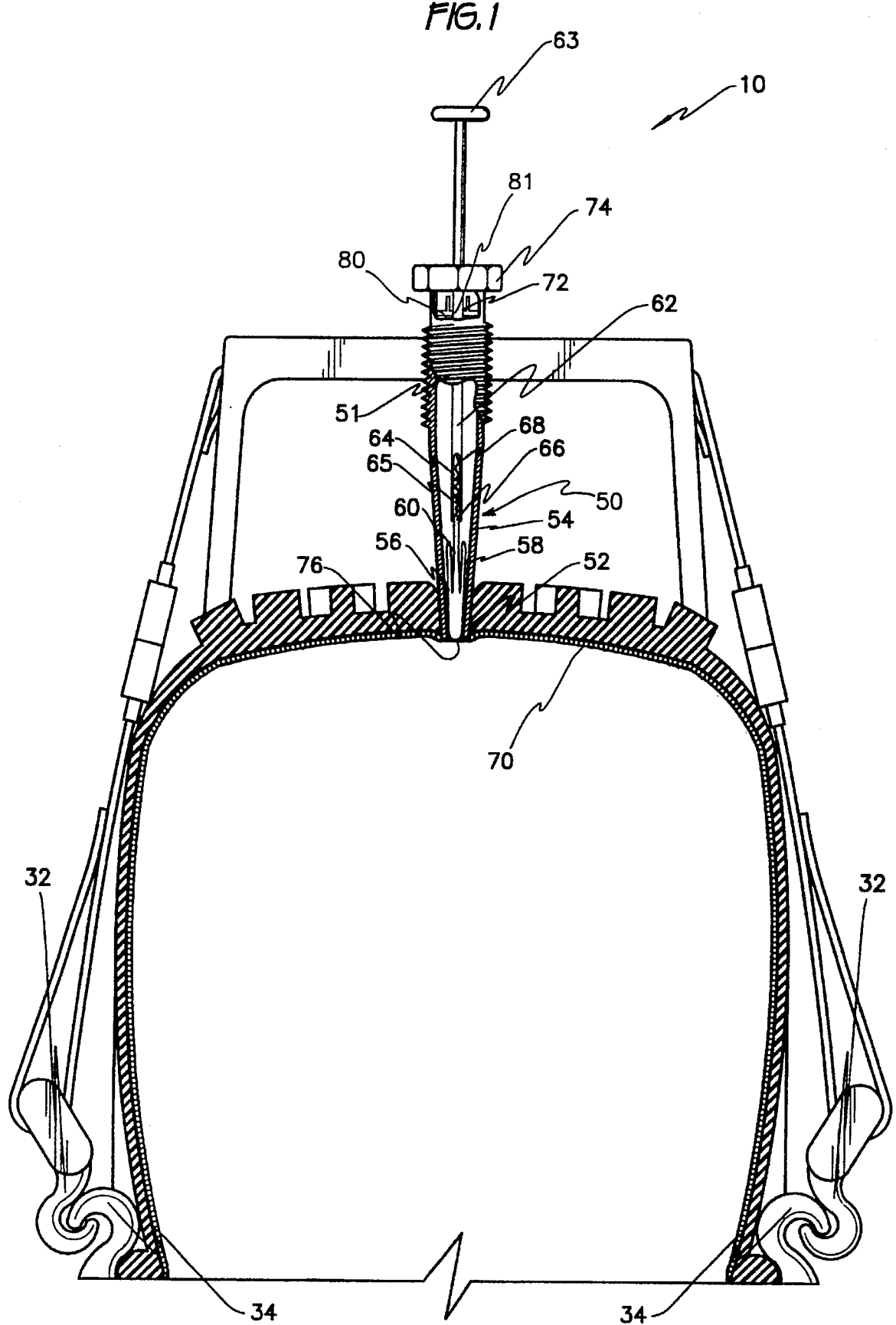
FIG. 1 is a front elevation of the assembled tire puncture repair apparatus as it appears immediately prior to the initial step of inserting the boot.

Referring now to the drawings, particularly FIG. 1, the present invention will be understood to comprise a tire repair tool assembly, generally designated 10 and which is intended to carry out the repair of a punctured tire as mounted upon a vehicle wheel. This does not rule out employing the instant apparatus to repair a punctured tire on a wheel that is off a vehicle although it will be appreciated that the greatest advantage is obtained when repairing a damaged tire in situ. With the tool assembly 10, as soon as a puncture is evident, the necessary repair may be accomplished with substantially greater ease than heretofore, greatly minimizing the down time for the vehicle involved.

The assembly 10 is fixedly attached to the exterior of a mounted tire 12 by utilizing a mounting unit 14 including a platform 16 provided with a central span 18 bounded by depending legs 20—20 each terminating in a foot 22 adapted to frictionally engage the tread 24 on either side of a tire puncture 26. The mounting platform 16 is securely affixed in the position shown in FIG. 1 through the use of appropriate releasable anchor elements such as the illustrated straps 28—28 each having an upper or one end 30 secured to one side of the mounting unit 14. The opposite or lower end of each strap 28 is provided with a hook formation 32 configured to engage the curved edge 34 of the associated wheel rim upon which the tire 12 is mounted.

To enable a firm attachment of the mounting unit 14 in a biased manner upon the tire 12, the straps 28 are provided with adjustable tensioning devices such as turn buckles 36. Any other suitable device may be utilized such as adjustable over center clamps as are well known for securing lading straps and the like in a tensioned manner.

The mounting unit 14 is secured to a punctured tire 12 with the platform central span 18 juxtaposed the wound or puncture in the tire tread 24. This is obviously after any foreign item which may have caused the puncture is removed by conventional means. In many cases, a tire is punctured by a spike or the like on the pavement or ground and in such cases the mounting unit 14 may be attached and secured immediately upon locating the point of the wound or puncture. To accommodate punctures made at various points across the width of a tire tread, the platform legs 20—20 may be constructed such that they are spaced apart a distance less than the typical tread width expected to be operated upon. In this manner, the platform may be shifted to one or the other side when necessary to align the center of its span 18 juxtaposed the puncture. With this in mind it will also follow that alternate width platforms may be provided to treat punctures, not only on different width tires but also to address punctures located off center on any one size of tire tread.

The mounting unit will be seen to include a bridge 38 comprising a horizontal span 40 having a pair of arms 42—42 in turn removably attached to the platform 16, such as by the bolts 44. Both the bridge span 40 and platform span 18 are provided with a tapped opening or bore 46 and 48, respectively and these bores will be understood to be axially aligned. In this regards, another alternative to accommodating punctures off center of the tire tread will be to form these bores 46,48 slightly off center of their respective spans.

With the mounting unit 14 as above described firmly anchored to the wheel of the damaged tire and with the tapped bores 46,48 axially aligned above the puncture wound, the repair procedure can be carried out. Initially, an elongated probe, drill or induction tube 50 having external threads 51 mating with the threads of the bore 48, is advanced through the central span 18 of the platform 16 until its lower tapered tip 52 reaches the tire tread at the entry point of the puncture. The hollow interior 54 is supplied with a unique rubber boot generally designated 56 and which includes a generally circular imperforate main body 58 attached to an upwardly directed central stem 60. These components of the boot are analogous to an umbrella with the main body 58 being collapsed about the stem 60 when inserted into the probe interior 54 and in view of the integral construction of the boot elements, the main body is in a biased condition when thusly collapsed. The boot is urged to the position of FIG. 1 by means of a plunger rod 62 and will be seen to loosely pass through an aperture 81 of a piston 80 in the probe. The rod 62 includes an upper end 63 having a cavity 64 in its lower end 65 within which is loosely fitted the upper end 66 of the substantially rigid boot central stem 60. Also disposed within the cavity 64 is a collapsed or foleded, flexible tether 68 having opposite ends respectively connected to the boot stem upper end 60 and the plunger rod 62.

To carry forth with the repair procedure, the probe 50 is advanced to urge its lower tip 52 to course the path of the puncture through the tire tread until the probe tip parts the tire casing inner surface 70. This action is readily achieved in view of the anchoring of the mounting unit 14 in a most stable manner relative the mounted tire whereby rotary displacement of the probe 50 produces a high mechanical advantage resulting in a smooth yet positive advancement of the probe tip through the tire casing. Any well known wrench device, such as an open end or box end wrench (not shown) is employed to obtain the relative effortless insertion of the probe as described above and accordingly, the upper, open proximal end 72 of the probe is constructed with a formation mating with the desired wrench tool, such as the hexagonal formation 74.

When the probe tip 52 has reached the inner tire surface 70, the plunger rod 62 is depressed and moves through the apertured piston 80 to urge the collapsed rubber boot 56 through the distal open end 76 of the probe 50 and as soon as the circular main body 58 is ejected through the open end 76 it springs to a radially extending open position projecting substantially beyond the point of the puncture 26 while its integral central stem 60 remains within the probe interior 54. Thence, the plunger rod 62 is withdrawn from the upper, proximal end 72, separating the plunger rod cavity 64 from the boot central stem 60 but still connected thereto by way of the flexible tether 68.

Figure 2:
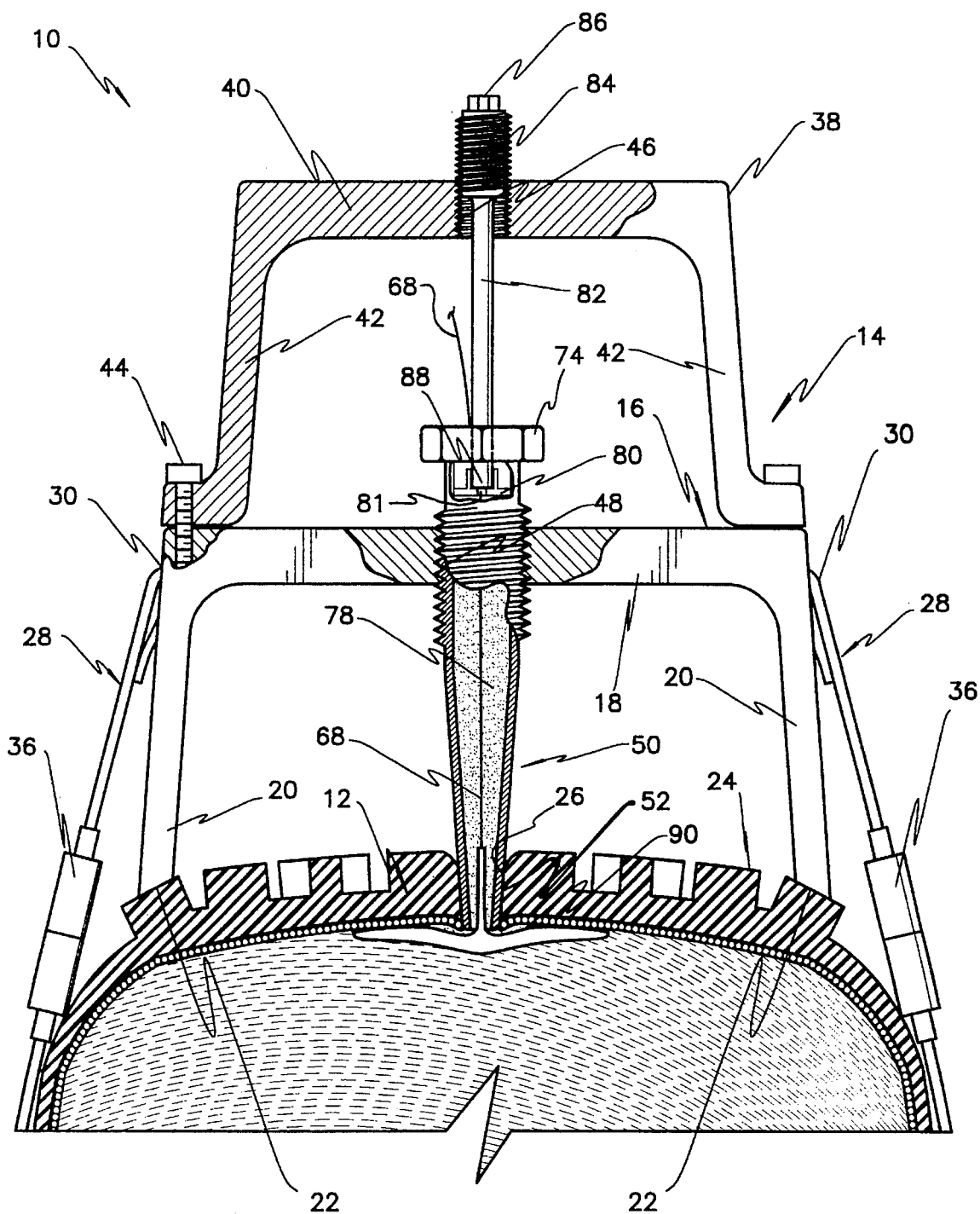
FIG. 2 is a front elevation of the apparatus of FIG. 1 with the balance of the mounting unit installed prior to injection of the molten rubber bonding fluid.

For ease of manipulation during the foregoing procedure the bridge 38 may be omitted from the platform 16 yet it is possible, depending upon the thickness of the tire casing, to accomplish the insertion of the probe 50 and admission of the rubber boot 56 while having the bridge 38 in place. In any case, the bridge provides the mechanical advantage for achieving the final step of admitting the liquid rubber or selected fluid bonding compound necessary to seal the rubber boot in place over the puncture wound. A measured amount of the bonding fluid 78 is placed within the probe interior 54 while the upper end of the boot tether 68 is retained outside the proximal end 72 of the probe as shown in FIG. 2. The measured volume of bonding fluid 78 may be poured, injected or otherwise placed inside the probe such as by way of a frangible flexible capsule. An upward force is maintained upon the free end of the tether 68 so as to urge the open rubber boot to remain flushly engaged with the tire casing inner surface.

Thereafter, a drive rod 82 having external threads 84 mating with the bridge tapped bore 46, is threadedly advanced such as by applying a wrench to the wrench formation 86, to smoothly and positively urge the lower end 88 of the drive rod 82 downwardly against the piston 80 and force the bonding fluid 78 from the probe distal open end 76. As this fluid issues from the probe tip it can only flow into the interface between the boot upper surface 90 and juxtaposed tire casing inner surface 70.

The foregoing action continues for a predetermined interval designed to insure a complete bathing of the interface between the boot main body and tire casing and then, the probe is withdrawn by applying a reverse rotary action to the probe wrench formation 74. As the probe is threadedly withdrawn through the platform 16 and its distal tip 52 retracted from the path of the original puncture, the stationary drive rod 82 forces the balance of the measured bonding fluid within the probe 50 to fill and seal the course of the puncture in the body of the tire between the casing interior and the exterior of the tread. Thus, the boot stem 60 will be understood to become completely sealed and when the probe is fully retracted from the platform 16, the final act comprises cutting off any exposed remains of the boot tether 68.

Upon removal of the mounting unit 14, air may be added to the repaired tire and the repair procedure is considered completed.

From the foregoing it will be appreciated that a vastly improved apparatus for repairing tire punctures in situ is provided and which enables one person to accomplish the repair, even upon oversized tires, with no other tools other than a conventional wrench serving to provide mechanical advantage controlling the operation of a displaceable probe that sequentially admits a unique collapsible rubber boot and bonding fluid.

From the foregoing description, one skilled in the art can easily ascertain the essential characteristics of this invention and, without departing from the spirit and scope thereof, can make various changes and modifications of the invention to adapt it to various usages and conditions. For example, the artisan could easily ascertain that certain wheel rim shapes might be different than curved edge 34 in of a wheel rim might be differently shaped and thus require a different complementary shape for hook formation 32.

It is to be understood that the provided illustrative examples are by no means exhaustive of the many possible uses for my invention.

It is to be understood that the present invention is not limited to the sole embodiment described above, but encompasses any and all embodiments within the scope of the following claims:

I claim:

1. A tire puncture repair apparatus comprising;

a mounting unit having a tapped bore, an elongated probe having external threads mating with said mounting unit tapped bore, said probe provided with a hollow interior and having opposite distal and proximal open ends with said distal open end adapted to be inserted through a tire puncture from the tread of a tire to the inner surface of a tire casing, said probe, upon rotation in opposite directions, is advanced and retracted through the tire puncture, attachment elements operable to fixedly secure said mounting unit to the tire adjacent the puncture, a rubber boot initially disposed within said probe interior and including a collapsed main body attached to a central stem, a piston within said probe hollow interior at said proximal open end and having an aperture therethrough, a plunger rod engaging said boot and having an upper end projecting through said piston aperture and above said probe proximal open end, a flexible foldable tether joining said boot to said plunger rod, whereby following insertion of said probe distal end through the puncture to the inner surface of a tire casing, subsequent downward displacement of said plunger rod forces said boot main body through the puncture and into an un-collapsed position radially extending in a coextensive manner around the puncture while withdrawal of said plunger rod unfolds and then withdraws said flexible tether through said piston aperture in said probe proximal open end, said probe hollow interior adapted to receive a measure of rubber bonding fluid beneath said piston, and a drive rod having a lower end insertable into said probe and engageable atop said piston, whereby upon downward displacement of said drive rod said piston forces said rubber bonding fluid to exit said probe distal open end to sealingly attach said boot main body to the tire inner surface juxtaposed the puncture.

2. The tire puncture repair apparatus according to claim 1 wherein said rubber boot main body and central stem are integral.

3. The tire puncture repair apparatus according to claim 2 wherein said rubber boot main body and central stem when collapsed and un-collapsed is akin to an umbrella.

4. The tire puncture repair apparatus according to claim 1 wherein said rubber boot main body defines a generally circular imperforate body when un-collapsed.

5. The tire puncture repair apparatus according to claim 4 wherein said tether is flexible and substantially non-elastic.

6. The tire puncture repair apparatus according to claim 1 wherein said plunger rod includes a lower end provided with a cavity, said rubber boot central stem includes an upper end, and said central stem upper end and tether are initially disposed within said plunger rod cavity.

7. The tire puncture repair apparatus according to claim 1 including a wrench engaging formation on said probe adjacent said proximal open end.

8. The tire puncture repair apparatus according to claim 1 wherein, said mounting unit includes a platform having a substantially horizontal central span provided with a pair of depending legs engageable with the tread of a tire, said tapped bore is disposed in said central span, and said attachment elements comprise adjustable straps engageable with a rim of a wheel upon which the tire is mounted.

9. The tire puncture repair apparatus according to claim 8 including, a bridge mounted upon said platform and provided with a horizontal span having a tapped bore therethrough, said drive rod including external threads insertable through said horizontal span tapped bore, and a lower end on said drive rod insertable within said probe proximal open end, and said piston in said probe interior engageable by said drive rod lower end, whereby upon rotation of said drive rod said piston is urged downwardly to force said rubber bonding fluid to exit said probe distal open end.

10. The tire puncture repair apparatus according to claim 9 including a wrench engaging formation on said drive rod adjacent said drive rod external threads.

\* \* \* \* \*